United States Patent
Tkaczyk et al.

(10) Patent No.: US 12,428,259 B2
(45) Date of Patent: Sep. 30, 2025

(54) OCCUPANT-BASED INTELLIGENT ELEVATOR ACTIONS

(71) Applicant: International Business Machines Corporation, Armonk, NY (US)

(72) Inventors: Gregory M. J. H. Tkaczyk, Mississauga (CA); Adam Lee Griffin, Cohasset, MN (US); Shikhar Kwatra, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1232 days.

(21) Appl. No.: 17/205,020

(22) Filed: Mar. 18, 2021

(65) Prior Publication Data
US 2022/0297975 A1    Sep. 22, 2022

(51) Int. Cl.
*B66B 1/24*    (2006.01)
*B66B 3/00*    (2006.01)
(Continued)

(52) U.S. Cl.
CPC ............ *B66B 1/2408* (2013.01); *G05B 15/02* (2013.01); *B66B 3/006* (2013.01); *B66B 13/146* (2013.01); *B66B 2201/103* (2013.01); *B66B 2201/21* (2013.01); *B66B 2201/232* (2013.01); *B66B 2201/234* (2013.01); *B66B 2201/243* (2013.01);
(Continued)

(58) Field of Classification Search
None
See application file for complete search history.

(56) References Cited

U.S. PATENT DOCUMENTS

2009/0057068 A1    3/2009   Lin et al.
2010/0294600 A1*   11/2010  Christy .................. B66B 1/468
                                                          187/383
(Continued)

FOREIGN PATENT DOCUMENTS

CN    104477714 A    4/2015
CN    104724558 A    6/2015
(Continued)

OTHER PUBLICATIONS

European Patent Office, "Extended European Search Report," Aug. 9, 2024, 9 Pages, EP Application No. 22770237.0.
(Continued)

*Primary Examiner* — Binh Q Tran
(74) *Attorney, Agent, or Firm* — Kelsey M. Skodje

(57) ABSTRACT

A method, system, and computer program product for occupant-based elevator actions are provided. The method identifies a set of subjects approaching a set of elevators to generate a set of identities for the set of subjects. A set of initial priority statuses are generated for the set of subjects. Based on the set of identities and the set of initial priority statuses, an elevator dispatch solution is determined. The method updates at least a portion of the initial priority statuses to generate a set of subsequent priority statuses in response to a subset of subjects entering at least one elevator. The method determines an isolation response for a first subject of the subset of subjects and modifies the elevator dispatch solution based on the isolation response to generate an isolation dispatch solution. The at least one elevator executes the isolation dispatch solution.

20 Claims, 6 Drawing Sheets

(51) Int. Cl.
*B66B 13/14* (2006.01)
*G05B 15/02* (2006.01)

(52) U.S. Cl.
CPC . *B66B 2201/402* (2013.01); *B66B 2201/4615* (2013.01); *B66B 2201/4638* (2013.01); *B66B 2201/4661* (2013.01)

(56) References Cited

U.S. PATENT DOCUMENTS

| | | | |
|---|---|---|---|
| 2016/0244295 | A1 | 8/2016 | Salmikuukka |
| 2016/0368732 | A1 | 12/2016 | Zhao et al. |
| 2017/0362052 | A1 | 12/2017 | Chapman |
| 2018/0093860 | A1 | 4/2018 | Saperstein et al. |
| 2018/0273346 | A1 | 9/2018 | Hwang et al. |
| 2018/0346283 | A1 | 12/2018 | Scoville et al. |
| 2019/0016557 | A1* | 1/2019 | Baldi ............... B66B 5/0012 |
| 2019/0023527 | A1* | 1/2019 | Larmuseau .......... B66B 1/3461 |
| 2019/0122462 | A1 | 4/2019 | Wedzikowski et al. |
| 2019/0241398 | A1 | 8/2019 | Marvin et al. |
| 2019/0389689 | A1* | 12/2019 | Jia ................... B66B 1/2458 |
| 2020/0307950 | A1 | 10/2020 | Sudi et al. |
| 2020/0331723 | A1* | 10/2020 | Sudi ................... B66B 1/468 |
| 2021/0024326 | A1* | 1/2021 | Polak ............... B66B 5/0012 |
| 2021/0339979 | A1* | 11/2021 | Auxier ............. B66B 5/0018 |
| 2022/0185622 | A1* | 6/2022 | Miriyala ........... B66B 1/2408 |

FOREIGN PATENT DOCUMENTS

| | | |
|---|---|---|
| CN | 104724558 B | 4/2016 |
| CN | 105722780 A | 6/2016 |
| CN | 107128763 A | 9/2017 |
| CN | 207713199 U | 8/2018 |
| CN | 108564146 A | 9/2018 |
| CN | 108975098 A | 12/2018 |
| CN | 109191639 A | 1/2019 |
| CN | 107337032 B | 3/2019 |
| CN | 111232788 A | 6/2020 |
| CN | 111792467 A | 10/2020 |
| KR | 100898916 B1 | 5/2009 |
| KR | 20180018223 A | 2/2018 |
| WO | 2012065360 A1 | 5/2012 |
| WO | 2018075463 A1 | 4/2018 |

OTHER PUBLICATIONS

International Search Report and Written Opinion for Application PCT/CN2022/076007, Apr. 8, 2022, 9 pages.
Reply to EP Extended Search Report, Nov. 28, 2024, Application No. 22770237.0, 3 pages.
"A method to improve elevator scheduling", An IP.com Prior Art Database Technical Disclosure, IP.com No. PCOM000261961D, IP.com Electronic Publication Date: Apr. 21, 2020, 3 pages.
"Method and System for Delivering Personalized Advertising to Occupants of an Elevator Car", An IP.com Prior Art Database Technical Disclosure, IP.com No. IPCOM000255301D, IP.com Electronic Publication Date: Sep. 14, 2018, 4 pages.
"List of elevator special modes", Fandom, printed Nov. 6, 2020, 4 pages. http://elevation.wikia.com/wiki/List_of_elevator_special_modes.
Ehrnrooth et al., "Intelligent services for elevators and escalators built with IBM Watson", IoT, IBM, Mar. 17, 2017, 9 pages. https://www.ibm.com/blogs/cloud-computing/2017/03/17/intelligent-services-elevators-escalators-watson/.
Mell et al., "The NIST Definition of Cloud Computing", Recommendations of the National Institute of Standards and Technology, Special Publication 800-145, Sep. 2011, 7 pages.

* cited by examiner

OCCUPANT-BASED INTELLIGENT ELEVATOR ACTIONS

BACKGROUND

Elevator systems are often controlled with a combination of mechanical and software means. Where elevators are part of a bank of elevators, elevators of the bank of elevators may be controlled to provide distribution of passengers. Elevators have been controlled by software included in a dispatching system to plan pathing of elevators within a bank to mitigate high traffic times for travel within a bank of elevators. Elevator control software and dispatching systems have been used to control some aspects of elevator door and button function.

SUMMARY

According to an embodiment described herein, a computer-implemented method for occupant-based elevator actions is provided. The method identifies a set of subjects approaching a set of elevators to generate a set of identities for the set of subjects. A set of initial priority statuses are generated for the set of subjects. Each initial priority status is generated based on an identity for a subject of the set of subjects. Based on the set of identities and the set of initial priority statuses, an elevator dispatch solution is determined for one or more elevators of the set of elevators. In response to a subset of subjects entering at least one elevator, at least a portion of the initial priority statuses are updated to generate a set of subsequent priority statuses. The method determines an isolation response for a first subject of the subset of subjects. The elevator dispatch solution is modified based on at least a portion of the set of subsequent priority statuses and the isolation response to generate an isolation dispatch solution. The method causes the at least one elevator to execute the isolation dispatch solution.

According to an embodiment described herein, a system for occupant-based elevator actions is provided. The system includes one or more processors and a computer-readable storage medium, coupled to the one or more processors, storing program instructions that, when executed by the one or more processors, cause the one or more processors to perform operations. The operations identify a set of subjects approaching a set of elevators to generate a set of identities for the set of subjects. A set of initial priority statuses are generated for the set of subjects. Each initial priority status is generated based on an identity for a subject of the set of subjects. Based on the set of identities and the set of initial priority statuses, an elevator dispatch solution is determined for one or more elevators of the set of elevators. In response to a subset of subjects entering at least one elevator, at least a portion of the initial priority statuses are updated to generate a set of subsequent priority statuses. The operations determine an isolation response for a first subject of the subset of subjects. The elevator dispatch solution is modified based on at least a portion of the set of subsequent priority statuses and the isolation response to generate an isolation dispatch solution. The operations cause the at least one elevator to execute the isolation dispatch solution.

According to an embodiment described herein, a computer program product for occupant-based elevator actions is provided. The computer program product includes a computer-readable storage medium having program instructions embodied therewith, the program instructions being executable by one or more processors to cause the one or more processors to identify a set of subjects approaching a set of elevators to generate a set of identities for the set of subjects. A set of initial priority statuses are generated for the set of subjects. Each initial priority status is generated based on an identity for a subject of the set of subjects. Based on the set of identities and the set of initial priority statuses, an elevator dispatch solution is determined for one or more elevators of the set of elevators. In response to a subset of subjects entering at least one elevator, at least a portion of the initial priority statuses are updated to generate a set of subsequent priority statuses. The computer program product determines an isolation response for a first subject of the subset of subjects. The elevator dispatch solution is modified based on at least a portion of the set of subsequent priority statuses and the isolation response to generate an isolation dispatch solution. The computer program product causes the at least one elevator to execute the isolation dispatch solution.

DETAILED DESCRIPTION

Figure 1:
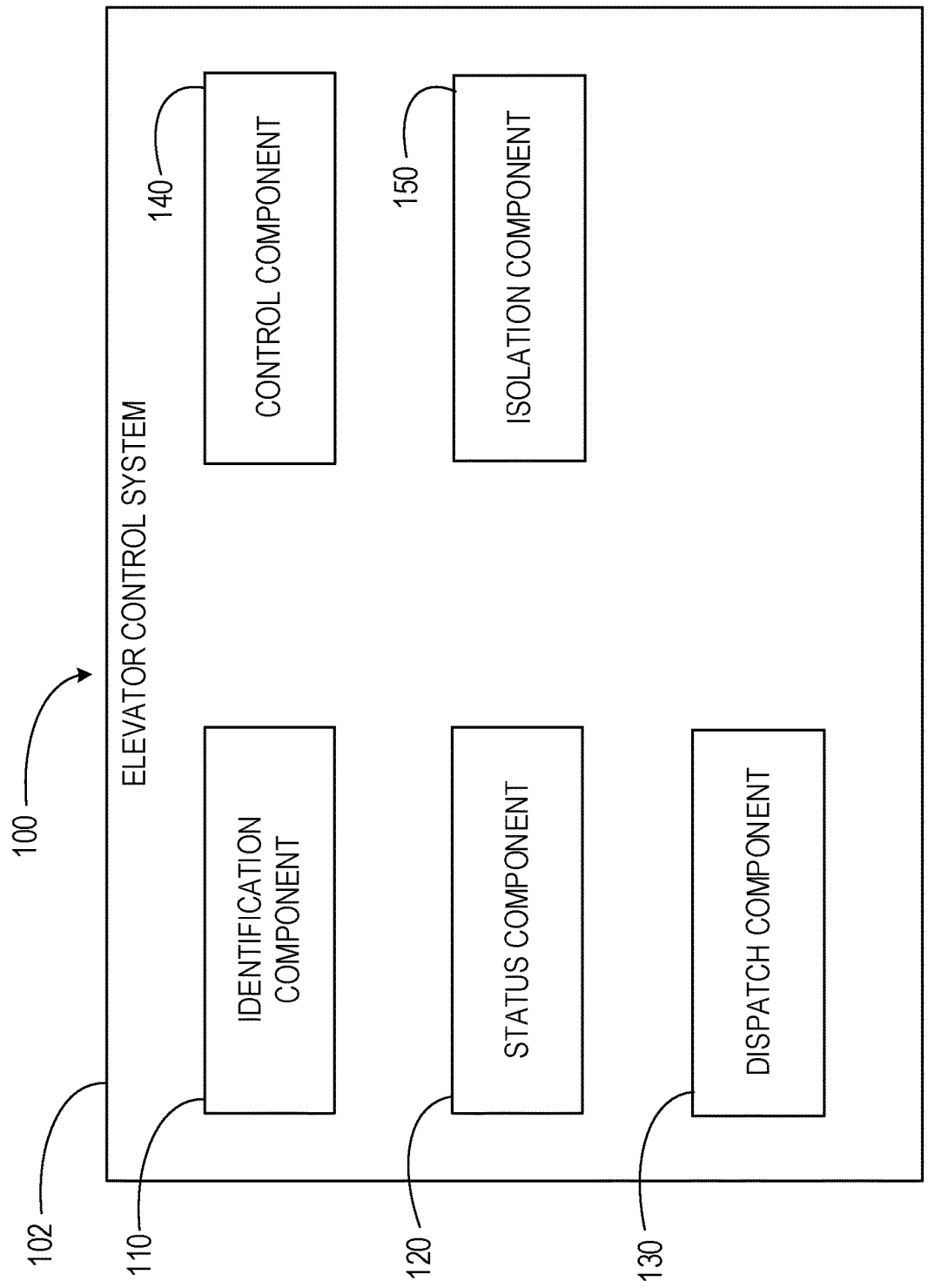
FIG. 1 depicts a block diagram of a computing environment for implementing concepts and computer-based methods, according to at least one embodiment.

The present disclosure relates generally to methods for occupant-based elevator actions. More particularly, but not exclusively, embodiments of the present disclosure relate to methods for prioritization and isolation of elevator actions based on elevator occupancy, occupant characteristics, and potential occupants. The present disclosure relates further to a related system for occupant-based elevator actions, and a computer program product for operating such a system.

Elevator systems have been used to enable movement of occupants to varying floors within buildings. Some elevator systems combine mechanical and software control systems to control single elevators or coordinate multiple elevators within an elevator bank. Elevator control systems may coordinate elevators to mitigate traffic times by organizing pathing of elevators and floor stops. Elevator control systems may include monitoring elevator equipment, occupant flow, machine to machine interactions, and human to machine interactions.

Elevator systems often function by delivering occupants in sequential order to selected floors. Some systems assign occupants to specified elevator cars within an elevator bank to increase efficiency of occupant delivery. Elevator systems often do not account for individual occupants or potential occupants. For example, elevator systems often do not account for observable or assigned attributes for users, occupants, or potential occupants. Elevator systems often fail to account for user or occupant importance or relative importance when determining pathing of elevators or distribution of passengers to individual elevators within an elevator bank. Elevator systems similarly fail to account for environmental or event context for elevator pathing and scheduling. Elevator systems additionally fail to account for individual or group preferences of users or passengers. In addition to elevator pathing and passenger distribution, elevator systems often fail to dynamically adjust elevator movement or internal car environment based on the factors or characteristics referenced above. Further, elevator systems do not provide an elevator mode enabling dynamic isolation of a passenger. For example, elevator systems have traditionally failed to determine an identity, a destination, and isolation factors for a given passenger.

Embodiments of the present disclosure provide an elevator control system for prioritized occupant delivery. The prioritized occupant-based delivery may be performed using contextually classified information. The contextually classified information may include Internet of Things (IoT) observed inputs, object detection, environmental information, event information, route planning, and other gathered intelligence. The prioritized occupant-based delivery enables the elevator control system to determine logical and/or prioritized drop off points within a set or system of elevators. In some embodiments, the elevator control system enables creation of associated priority scores for individuals or groups of occupants based on occupant status. For example, the elevator control system may identify passengers as clients, customers, VIPs, employees, delivery personnel, police/first responders, or other individual or group classifications.

Some embodiments of the present disclosure provide an elevator mode for an elevator control system. The elevator mode may provide capabilities of enhanced logical or prioritized delivery of passengers based on individualized, group-based, event-based, or environment-based considerations. In some embodiments, the elevator mode of the elevator control system enables dynamic monitoring and readjustment of elevator settings, including elevator car environment, entertainment, music, and delivery of occupants. The elevator mode enables generation of policies to be established based on a plurality of factors including environmental context, order preference, importance parameters, and isolation parameters. In some instances, the elevator mode enables ameliorative action in elevator-based prioritization and delivery of contents or occupants. In some embodiments, the elevator mode enables determination of special responses for individual occupants within a group of occupants. In some instances, the elevator mode enables an isolation response directed toward an individual. The isolation response may be based on environmental monitoring, passenger identification, object monitoring, and event monitoring. The isolation response enables the elevator control system to isolate a given elevator passenger from other passengers.

Embodiments of the present disclosure may expand facility or building security capabilities, such as in secured facilities. Some embodiments of the present disclosure provide increased access controls and access approval for secured facilities. Some embodiments of the present disclosure increase prioritization and efficiency of passenger delivery. Embodiments of the present disclosure enable increased IoT integration for elevator and elevator control systems. Some embodiments of the present disclosure enable dynamic generation and adjustment of policies for elevator movement and internal car environment. The dynamic generation and adjustment of policies may be based on factors including environmental context, preferences, passenger importance, and security.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an elevator control system 102. The elevator control system 102 may comprise an identification component 110, a status component 120, a dispatch component 130, a control component 140, and an isolation component 150. The identification component 110 identifies subjects or objects approaching or entering a set of elevators. The status component 120 generates and modifies priority statuses for subjects approaching or entering the set of elevators. The dispatch component 130 generates or determines and modifies elevator dispatch solutions for one or more elevators of the set of elevators based at least in part on the identities of subjects or objects and priority statuses. The control component 140 executes dispatch solutions for elevators within the set of elevators. The isolation component 150 determines and modifies isolation responses capable of being executed by the control component 140. Although described with distinct components, it should be understood that, in at least some embodiments, components may be combined or divided, and/or additional components may be added without departing from the scope of the present disclosure.

Figure 2:
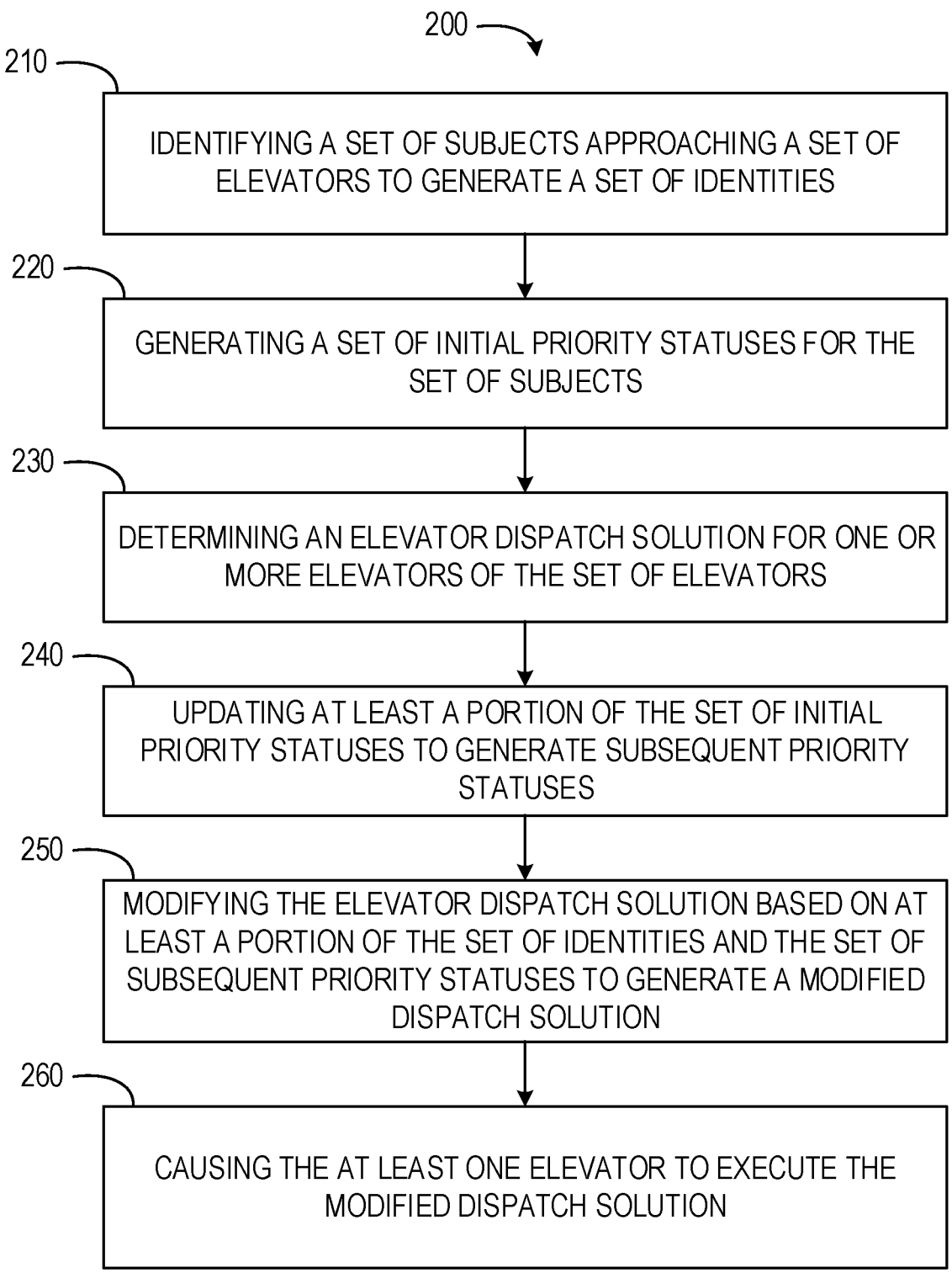
FIG. 2 depicts a flow diagram of a computer-implemented method for occupant-based elevator actions, according to at least one embodiment.

Referring now to FIG. 2, a flow diagram of a computer-implemented method 200 is shown. The computer-implemented method 200 is a method for occupant-based elevator actions. In some embodiments, the computer-implemented method 200 may be performed by one or more components of the computing environment 100 and the elevator control system 102, as described in more detail below.

At operation 210, the identification component 110 identifies a set of subjects approaching a set of elevators. The identification component 110 generates a set of identities for the set of subjects. Each subject of the set of subjects is associated with a generated identity of the set of identities. An identity may be generated by the identification component 110 based on identification information accessible to the identification component 110. The identification information may identify subjects as guests, employees, executives, or contractors associated with a facility housing the set of elevators. In such instances, the identification information may include information available to the facility. For example, a subject may have a facility classification such as guest, employee, or executive of the facility. The subject may also have identification information (e.g., a driver's license and a picture) or site registration information on file with the facility. A portion of the identification information (e.g., a picture, a name, and a facility classification) may be available to the identification component 110. Upon detection of subjects, such as by a camera or facility sensor, the identification component 110 may compare an image of the subject with identification information available to the facility to identify the subject's facility classification. Based on the facility classification, the identification component 110 may generate an identity for the subject.

The set of identities may be generated based on first identification information. The first identification information may be obtained by one or more facility sensors. In some embodiments, the first identification information includes site registration information, IoT observed inputs, object detection inputs, or any other suitable information. The first information may include information such as a facility classification, user importance, user preferences, environmental context, and other observable or assigned attributes. User importance may be reflected by a level of loyalty status, rewards level, membership level, or other attributes associated with or obtained from a subject's identity or facility classification. User preferences may include entertainment preferences (e.g., video or music preferences), climate preferences (e.g., temperature), lighting preferences, or any other suitable elevator passenger preferences. Environmental context may include luggage, packages, children, group size, or other observable aspects associated with each subject. In some embodiments, once the set of subjects are identified as approaching the set of elevators, the set of subjects are tracked using one or more sensors, such as facility sensors and elevator sensors.

Facility sensors may include image capture devices, radio-frequency identification (RFID) sensors, cellular identifiers, identification databases, infrared sensors, cognitive microwave radar, and other suitable sensors. Image capture devices may include cameras, such as still frame or video cameras. The image capture devices may include or cooperate with image, object, facial, or other recognition capabilities. The image recognition capabilities may enable the identification component 110 to identify subjects by comparing images of the subjects to identification information retained by the facility (e.g., current hotel registration records or employee records). RFID sensors may receive or identify a subject based on an RFID chip within a card, tag, bracelet, wearable device, or other device. Cellular identifiers may include near field communication (NFC), Wi-Fi, Bluetooth, or other receivers or transceivers capable of identifying a device associated with and proximate to a subject.

At operation 220, the status component 120 generates a set of initial priority statuses for the set of subjects. Each subject of the set of subjects is associated with one of the generated initial priority statuses. Each initial priority status is generated based on an identity for a subject of the set of subjects.

In some embodiments, the initial priority scores are calculated based on the identity of each subject of the set of subjects. The initial priority score for a subject may be calculated based on identification information, such as the first identification information. In some instances, the initial priority score may be calculated based on identification information in combination with one or more of event context and environmental context. For example, the identity of the subject may be used to calculate the initial priority score along with a number of objects or additional subjects associated with the subject for which the initial priority score is generated. In some embodiments, the additional subjects are children or members of a group. The number of objects may be a number of objects (e.g., bags) carried by or with the subject toward the set of elevators. In addition to the number of objects associated with the subject, a type of objects, size of objects, classification of objects, or other object characteristics. The status component 120 may also obtain external data for types of objects to incorporate into the initial priority statuses. The initial priority score for each subject may also be based on historical data for each subject.

In some embodiments, the initial priority status is generated as a priority record. The priority record may include a reference number, a subject identification, and the initial priority score. In some embodiments, the priority record includes prioritization details and response codes associated with the subject. The initial priority status may be generated by comparing the priority score for a subject to priority score thresholds. For example, priority score thresholds may differentiate subject types or priority types based on differences in a numerical priority score. In this example, subject types may be divided into VIP Guest, Gold Guest, Executive employee, Silver Guest, Non-status guest, employee, external contractor or business partner, and unknown. Response codes may define preset responses for a subject which are incorporated into the priority record. Special responses may include isolation of a subject, pre-set delivery floor for a subject, pre-set music preferences, elevator atmosphere preferences, entertainment display preferences, and priority override features.

At operation 230, the dispatch component 130 determines an elevator dispatch solution for one or more elevators of the set of elevators. In some embodiments, the elevator dispatch solution is determined based on the set of identities and the set of initial priorities. The dispatch component 130 may determine the elevator dispatch solution by comparing the set of initial priorities to determine elevator dispatch requirements. In some embodiments, the dispatch component 130 determines the elevator dispatch solution by sorting subjects of the set of subjects by prioritization scores of the set of initial priorities. The dispatch component 130 may then determine the delivery order based on one or more of the set of identities, the set of initial priorities, response codes, and priority scores. In some embodiments, the elevator dispatch solution orders may include a delivery order based on priority scores above a prioritization threshold.

In some embodiments, the dispatch component 130 determines the elevator dispatch solution as including environmental responses. Environmental responses may include music, information displayed on screens within the elevator, entertainment displayed within the elevator, temperature within the elevator, and other suitable environmental characteristics. The dispatch component 130 may determine environmental characteristics based on the set of initial priorities, priority scores, and set of identities of the subjects. For example, the elevator dispatch solution may be configured to display cartoons in an elevator when more children are present than a single gold member in a rewards program. Once the children exit the elevator, the elevator dispatch solution may be configured to display sports for the gold member based on an entertainment preference of the gold member. The entertainment preference may be stored within the priority record for the gold member, the remaining subject in the elevator.

In some embodiments, the dispatch component 130 determines the elevator dispatch solution by identifying prioritization scores of all subjects of the set of subjects. The dispatch component 130 sorts subjects by prioritization scores. The dispatch component 130 determines special responses for each subject. The dispatch component 130 may determine special responses, exist, do not exist, and, where present, which special response is associated with each subject. The dispatch component 130 then generates the elevator dispatch solution defining elevators to be used from the set of elevators and an elevator delivery or pathing schedule for the elevators to be used.

In some embodiments, the dispatch component 130 determines subsets of subjects to be assigned to each elevator selected for use. In such instances, the dispatch component 130 determines whether communication is available between the dispatch component 130 and the subjects to be assigned to each elevator. The dispatch component 130 may access the identification information for the subject or the priority record to determine if communication is available. The identification information or the priority record may include contact information for the subjects and contact permissions indicating a preapproved contact methods, subjects, or types for each subject. Where communication is authorized and available to the dispatch component 130, the dispatch component 130 may generate an elevator assignment communication and transmit the elevator assignment to the subject. Where communication is not available or approved, the dispatch component 130 may generate the elevator dispatch solution without contacting the subjects.

At operation 240, the status component 120 updates at least a portion of the set of initial priority statuses to generate a set of subsequent priority statuses. In some embodiments, the status component 120 updates the initial priority statuses in response to a subset of subjects entering at least one elevator. The status component 120 may cooperate with the identification component 110 to track entry of the subset of subjects into the at least one elevator based on one or more of facility sensors and elevator sensors.

In some embodiments, the identification component 110 modifies a subset of identities in response to the subset of subjects entering the at least one elevator. The subset of identities may correspond to the subset of subjects entering the at least one elevator. The subset of identities may be modified based on second information. The second information may be maintained by one or more elevator sensors. The second information may be gathered in addition to first information obtained by facility sensors.

In some embodiments, the second information includes location information for each subject of the subset of subjects. The location information may be identified and maintained by the identification component 110 from elevator sensors indicating that the subjects of the subset of subjects are currently in or entered a given elevator. Upon entering the elevator, priority scores for subset of subjects may be increased. In some instances, upon the subset of subjects entering the elevator, priority scores for a remaining portion of the set of subjects may be removed or reduced. The priority scores for the remaining portion of subjects may be reduced or removed with respect to an elevator into which the subset of subjects entered, transferred to another elevator, divided among two or more elevators, or discarded. Once the subset of subjects have entered the elevator, the identification component 110 may monitor the subset of subjects to determine times and floors at which the subjects exit the elevator. The identification component 110 and status component 120 may cooperate to monitor entry of new subjects onto the elevator and iteratively identify new subjects, generate priority statuses for the new subjects, and modify the set of initial priority statuses to reflect insertion of the priority status for the new subject.

When a subject exits the elevator, the identification component 110 logs the exit and the status component 120 updates or removes a priority status associated with the subject. For example, when a subject exits the elevator, the status component 120 may reduce a priority score for the subject to zero. The status component 120 may also remove the priority record or the initial priority status from the set of initial priority statuses for the subset of subjects.

At operation 250, the dispatch component 130 modifies the elevator dispatch solution based on at least a portion of the set of identities and the set of subsequent priority statuses to generate a modified dispatch solution. In some embodiments, the dispatch component 130 modifies the elevator dispatch solution to include the subset of subjects who entered the elevator. In some embodiments, the dispatch component 130 modifies the elevator dispatch solution iteratively as subjects of the subset of subjects exit the elevator and new subjects enter the elevator.

At operation 260, the control component 140 causes the at least one elevator to execute the modified dispatch solution. In some embodiments, the control component 140 executes the modified dispatch solution after the initial dispatch solution has been modified by the dispatch component 130. In some instances, the control component 140 executes the modified dispatch solution contemporaneously with the dispatch component 130 performing iterative modifications of the dispatch solution. In such instances, the control component 140 and dispatch component 130 cooperate to complete execution of the modified dispatch solution while responding to newly entering and exiting subjects.

Figure 3:
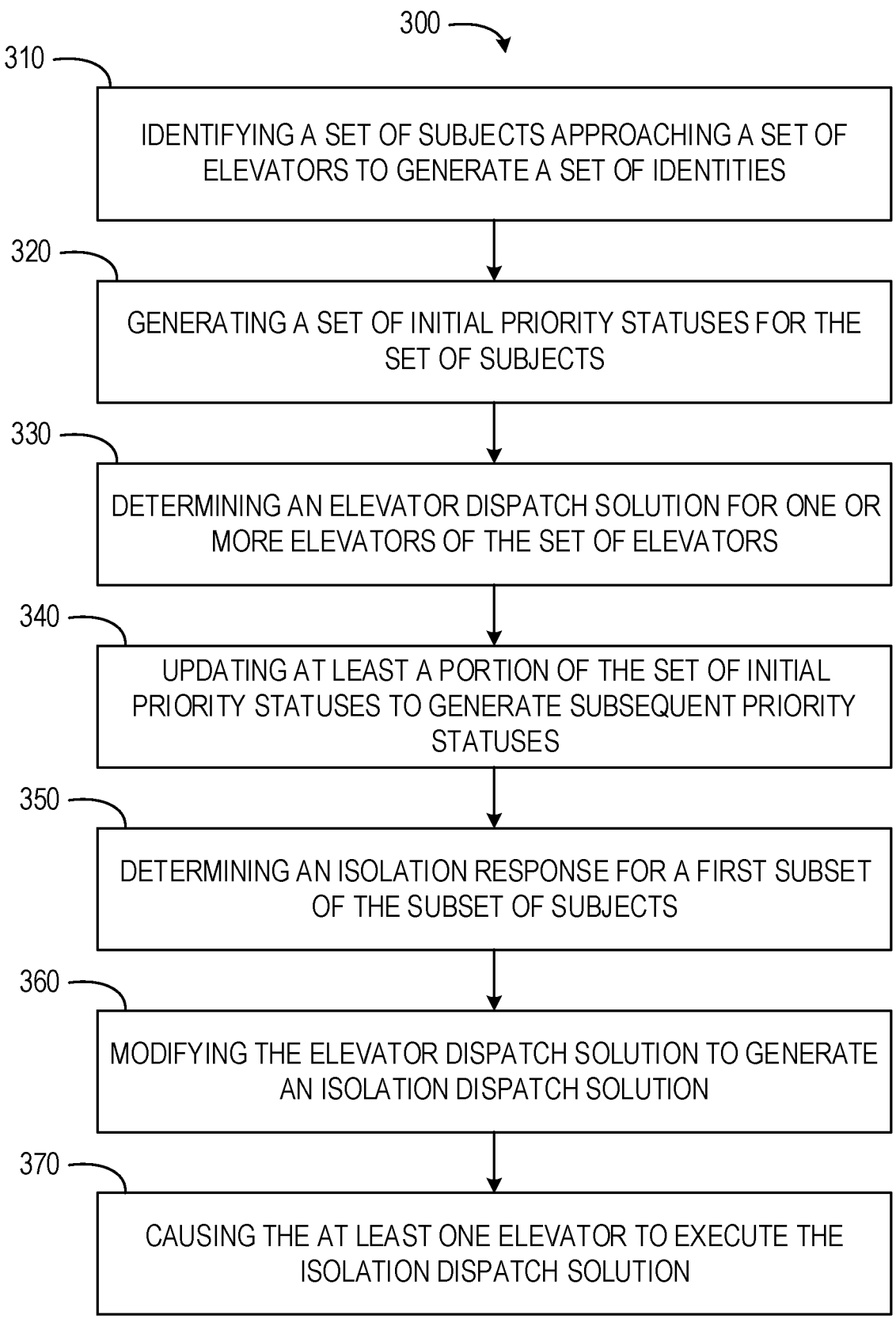
FIG. 3 depicts a flow diagram of a computer-implemented method for occupant-based elevator actions, according to at least one embodiment.

FIG. 3 shows a flow diagram of an embodiment of a computer-implemented method 300 for occupant-based elevator actions. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the identification component 110 identifies a set of subjects approaching a set of elevators. In some embodiments, the identification component 110 generates a set of identities for the set of subjects. The set of identities may be obtained, determined, and generated based on first identification information obtained by sensors accessible to the identification component 110. In some embodiments, the sensors include facility sensors. In some embodiments, the identification component 110 identifies the set of subjects in a manner similar to or the same as described above with respect to operation 210.

In operation 320, the status component 120 generates a set of initial priority statuses for the set of subjects. In some embodiments, each initial priority status is generated based on an identity for a subject of the set of subjects. The initial priority statuses may be generated for each subject of the set of subjects to include one or more isolation responses. In some embodiments, the status component 120 generates the set of initial priority statuses in a manner similar to or the same as described above with respect to operation 220.

In operation 330, the dispatch component 130 determines an elevator dispatch solution for one or more elevators of the set of elevators. In some embodiments, the elevator dispatch solution is determined based on the set of identities and the set of initial priority statuses. The elevator dispatch solution may include one or more lockout solutions for the remaining elevators of the set of elevators. The lockout solutions may preclude operation of the remaining elevators for the set of subjects approaching the set of elevators. In some embodiments, the dispatch component 130 determines the elevator dispatch solution in a manner similar to the manner described above with respect to operation 230.

In operation 340, the status component 120 updates at least a portion of the set of initial priority statuses to generate a set of subsequent priority statuses. In some embodiments, the initial priority statuses are updated in response to a subset of subjects entering at least one elevator.

In some embodiments, the identification component 110 modifies a subset of identities in response to the subset of subjects entering the at least one elevator. The subset of identities may correspond to the subset of subjects entering the at least one elevator. The subset of identities may be modified based on second identification information obtained by elevator sensors for the at least one elevator. In some instances, the second identification information is gathered in addition to first identification information gathered by facility sensors. The second identification information may include isolating events, event contexts, environmental contexts, or other information which indicates a potential need to isolation one or more subjects within the subset of subjects who entered the at least one elevator.

In operation 350, the isolation component 150 determines an isolation response for a first subject of the subset of subjects. The isolation response may indicate that the first passenger is to be isolated or removed from the other passengers of the subset of passengers. In some instances, the isolation response indicates that the first passenger is to be isolated from a specified elevator of the set of elevators. The isolation response may indicate that the first passenger is to be isolated from a specified building floor or facility.

In some embodiments, the isolation response is determined based on an identity of the first subject. In such instances, the first subject may have opted into isolation from a specified floor or facility. Opting in may allow a person to preclude access to certain resources or areas such as a bar, a casino, or other specified area. Opting in may be performed by and for an individual subject, a group of subjects, or combinations thereof. For example, an organizer of a convention may impose an isolation restriction on subjects attending the convention. The isolation response may be determined based on a positive or negative identity of the first subject. For example, where the identification component 110 identifies the first subject with associated identification information (e.g., a hotel identification or driver's license), the isolation response may be determined based on the first subject being a person prohibited within a facility. The isolation response may also be determined where an identity of the first subject cannot be matched to an authorized individual for a given facility (e.g., a negative identity).

In some embodiments, the isolation response is determined based on an isolation event associated with the first subject. Isolation events may be identified from environmental monitoring by one or more facility sensors or elevator sensors. For example, an isolation event may occur where the first subject is identified as carrying a prohibited object. The prohibited object may be an open prohibited object, carried by the first subject visibly. In some instances, the prohibited object may be a hidden object, carried by the first subject in a manner that obscures the prohibited object from direct observation (e.g., concealed on the person). In some embodiments, the hidden object may be in the form of suspicious packaging. Suspicious packaging may include abandoned or neglected packaging, damaged packaging, mislabeled packaging, known clandestine packaging, duplicate packaging, packaging associated with a history of suspicious activity, or any other package or package characteristic which may be identified as potentially containing one or more prohibited objects. In some instances, abandoned or neglected packages left in the at least one elevator may be identified as the first subject. In such instances, internal sensors in the elevator may identify the package as having been abandoned by a person who brought it into the elevator. The isolation component 150 may generate an abandoned package notification for response personnel, preclude additional individuals from entering the elevator while the package is unattended, move the elevator to a specified or desired floor, and maintain closed doors of the elevator until response personnel are in place to inspect the package. Prohibited objects may be identified by cognitive microwave radar, object recognition, optical character recognition, or any other suitable sensors or analytical techniques.

In operation 360, the dispatch component 130 modifies the elevator dispatch solution based on at least a portion of the set of subsequent priority statuses and the isolation response to generate an isolation dispatch solution. In some embodiments, executing the isolation dispatch solution isolates the first subject from one or more subjects of the subset of subjects that entered the at least one elevator. In some embodiments, executing the isolation dispatch solution locks one or more manual interface controls of the at least one elevator. The one or more manual interface controls may include an elevator panel, elevator navigation buttons (e.g., floor, door open, door close, stop, hold, or call buttons), a screen, a touchscreen, an information display, an entertainment display, a floor level display, a speaker, a speaker system, or any other suitable manual interface or display controls. In some embodiments, the isolation dispatch solution presents false information on one or more of the manual interface controls of the at least one elevator. In such embodiments, the dispatch component 130, the control component 140, and the isolation component 150 may cooperate to display in incorrect floor number during execution of the isolation dispatch solution. Display of the incorrect floor number may be executed at a time, during pathing of the at least one elevator, configured to cause or encourage the first subject to exit the at least one elevator and isolate the first subject from one or more other subjects on the at least one elevator.

In some embodiments, the dispatch component 130 cooperates with the isolation component 150 to modify the elevator dispatch solution. The isolation component 150 and the identification component 110 may determine a passenger destination of the first subject. The identification component 110 may determine destination of other subjects within the at least one elevator.

In some embodiments, the dispatch component 130 generates a notification for an operator. The dispatch component 130 may generate the notification based on or in response to generation of the isolation response and the isolation dispatch solution. The notification may include identification of the first subject, a reason or justification for the isolation response, actions to be taken in one or more isolation responses, and a proposed isolation dispatch solution. Generation and presentation of the notification to the operator enables the operator to approve or override the isolation dispatch solution. In some embodiments, the notification allows the operator to select a specified isolation response from a plurality of isolation responses. Selection of the specified isolation response may cause the dispatch component 130 to generate the isolation dispatch solution based on the specified isolation response and the elevator dispatch solution. In some instances, selection or approval of the proposed isolation dispatch solution passes an approval to the control component 140. The approval causes the control component 140 to perform operations on the at least one elevator as discussed in more detail below.

In operation 370, the control component 140 causes the at least one elevator to execute the isolation dispatch solution. In some embodiments, during execution of the isolation dispatch solution, the identification component 110 continuously monitors the subset of subjects within the at least one elevator. In some instances, the identification component 110 monitors the subset of subjects to determine entry and exits of one or more of the subset of subjects and the first subject for whom the isolation response was determined. In such embodiments, the identification component 110, the isolation component 150, and the dispatch component 130 may continuously modify the elevator dispatch solution of the operation 360. Continuous modification of the elevator dispatch solution may be performed iteratively based on exits of one or more of the subset of subjects or entry of new subjects into the at least one elevator.

The continuous modification of the elevator dispatch solution may actively adjust the movement or function of the at least one elevator to attempt to isolate the first subject. In some embodiments, active adjustment of the elevator dispatch solution, according to the isolation response and the entry/exit of subjects, includes stopping the at least one elevator (e.g., stopping the at least one elevator early), skipping floors, stopping at an incorrect floor, changing delivery order, and delivery of the first subject to a predetermined floor. In some embodiments, active adjustment of the elevator dispatch solution modifies additional elevators within the set of elevators. In such instances, dedicated elevator cars may be initiated for the first subject. For example, where the first subject has exited the at least one elevator at a selected or incorrect floor, the dispatch component 130 and the control component 140 may initiate a dedicated elevator from the set of elevators to retrieve the first subject and deposit the first subject at a designated floor.

In some embodiments, active adjustment of the elevator dispatch solution modifies aspects of the at least one elevator. The active adjustment of the elevator dispatch solution may include locking out elevator button panel functions, adjustment of an elevator environment, initiating communications with the first subject, adjustment of entertainment or information systems within the at least one elevator, and adjustment of elevator door functions.

In some embodiments, active adjustment of the elevator dispatch solution modifies one or more information systems or information displays within the at least one elevator. Modification of the information systems or information displays may be performed in effort to suggest, induce, or cause the first subject into leaving the at least one elevator to effect isolation of the first subject. For example, the isolation dispatch solution may slow or speed up an elevator run to appear as though an arrival floor is a desired floor, instead of a predetermined floor selected to isolate the first subject. Adjustment of the elevator run time may mimic an elevator trip duration to a desired floor (e.g., a fifteen second run time), while transporting the first subject to a different floor which normally has a shorter or longer run time (e.g., a five second run time or a thirty second run time). In some instances, modification of the information system or information display causes one or more of a floor display, a speaker, and a display screen to display or announce an audio and/or visual floor indication. The floor indication may falsely announce an expected floor of the first subject. The false announcement may obfuscate delivery of the first subject to a predetermined floor other than the expected floor. In some instances, the false announcement may be a false floor number pictured within a display device, providing a false floor number over a speaker, lighting or otherwise indicating a false floor number on a floor selection button, or combinations thereof.

The continuous modification of the elevator dispatch solution may be triggered by increased monitoring of the first subject entering the at least one elevator alone. The dispatch component 130, the control component 140, and the isolation component 150 may cooperate to close the door of the at least one elevator. The isolation dispatch solution may lockout the elevator panel for button or key functions attempted by the first subject. The isolation dispatch solution may override an elevator destination (e.g., an expected destination) of the first subject. In overriding the expected destination, the control component 140 and the isolation component 150 may substitute a specified destination for the expected destination. The control component 140 and the isolation component 150 may also preclude additional stops or pick up of subjects for the at least one elevator prior to the at least one elevator arriving at the specified destination. In some embodiments, the control component 140 may also initiate selected environmental features, such as changing of lighting or entertainment conditions, changing an airflow or smell, or any other suitable environmental features. In some instances, the control component 140 and the isolation component 150 may preclude the door of the at least one elevator from opening until a designated personnel response has been identified, selected, and arrived at the specified floor.

In some embodiments, the continuous modification of the elevator dispatch solution may be triggered by increased monitoring of the first subject and a presence of other subjects. The isolation component 150 may determine that an expected destination of the first subject is scheduled last in a current elevator dispatch solution. In such instances, the control component 140 may cause execution of the current elevator dispatch solution until the first subject is alone. The control component 140 may then implement or execute the isolation dispatch solution as in cases where the first subject entered the at least one elevator alone. Where the expected destination of the first subject is not last in the current elevator dispatch solution, the control component 140 may implement an isolation dispatch solution causing the expected destination (e.g., the expected floor of the first subject) to be skipped in the elevator dispatch solution. Once the other subjects have been delivered to their selected destinations, the control component 140 may execute the isolation dispatch solution as in cases where the first subject entered the at least one elevator alone.

Where the identification component 110 determines an early exit of the first subject, the isolation component 150 and the control component 140 may cooperate to execute the isolation dispatch solution for the first subject by dedicating a selected elevator of the set of elevators for the first subject. Where the first subject fails to enter the selected elevator, the isolation dispatch solution may terminate and generate a notification for designated response personnel indicating early exit of the first subject and a floor of the early exit. Where the first subject enters the selected elevator, the identification component 110 may determine whether the first subject is alone in the selected elevator. Where the first subject is alone, the control component 140 may execute the isolation dispatch solution as in cases where the first subject entered the at selected elevator alone. Where the first subject is not alone, the isolation component 150 may modify the isolation dispatch solution or generate a subsequent isolation dispatch solution for execution by the control component 140.

In some embodiments, the continuous modification of the elevator dispatch solution may be triggered by increased monitoring of the first subject and a presence of other subjects. The isolation component 150 and the dispatch component 130 may determine whether the expected destination of the first subject, selected by the first subject upon entering the at least one elevator, is a next floor. Where the expected destination is not a next floor, the control component 140 may deliver a next subject within the at least one elevator. Upon arriving at the next floor, if the subject exits the at least one elevator, the control component 140 may execute an isolation dispatch solution corresponding to an early exit of the first subject. Where the subject does not exit and is alone, the control component 140 may execute the isolation dispatch solution as if the first subject entered the at least one elevator alone. Where the subject is not alone, the control component 140 may revert to determining whether the expected destination of the subject is a next floor scheduled in the elevator dispatch solution.

Where the first subject is subject to an isolation dispatch solution, the control component 140 may determine a number of floors prior to the expected destination of the subject. Where more than one floor is scheduled for the elevator dispatch solution prior to the expected destination, the control component 140 may stop one floor before the expected destination according to the isolation dispatch solution. Where the subject exits early, the control component 140 and the isolation component 150 may cooperate to execute the isolation dispatch solution for early exit of the first subject. Where the subject remains on the elevator and all other subjects have exited, the control component 140 and the isolation component 150 may cooperate the execute the isolation dispatch solution as though the first subject entered the elevator alone. Where the first subject is not alone, the control component 140 and the isolation component 150 may cooperate to continue execution of the isolation dispatch solution. Where the expected destination of the first subject is a last destination of the isolation dispatch solution or the elevator dispatch solution, the expected destination may be skipped, delivering the first subject to a predetermined floor. Where the expected destination of the first subject is not a last destination, the isolation component 150 and the control component 140 may cooperate to skip the expected destination of the first subject and continue delivery of each subsequent subject on the at least one elevator. In each instance, the isolation dispatch solution or the elevator dispatch solution may be continuously modified based on a presence or exit of the first subject, additional subjects in the at least one elevator, destination floors of all subjects in the at least one elevator, or any other suitable factor.

In some embodiments, where the first subject is not alone and a destination of the first subject is not known (e.g., a floor button was already selected before entry of the first subject or the first subject selected no floor), the isolation component 150 and the control component 140 may cooperate to deliver a next passenger and respond based on an exit of the first subject. Where the first subject remains in the elevator, the control component 140 may clear all previously selected floor destinations. Clearing the floor destinations may cause the subjects in the elevator to reselect floor destinations. The isolation component 150, the control component 140, the dispatch component 130, the identification component 110 may cooperate to estimate the expected destination of the first subject. Where the expected destination is only for the first subject, the isolation component 150 and the control component 140 may cooperate to execute the isolation dispatch solution for the first subject having a singular destination as described above. Where the expected destination is shared by the first subject and another subject, the isolation component 150 and the control component 140 cooperate to execute the isolation dispatch solution for the first subject sharing a destination floor as described above.

Figure 4:
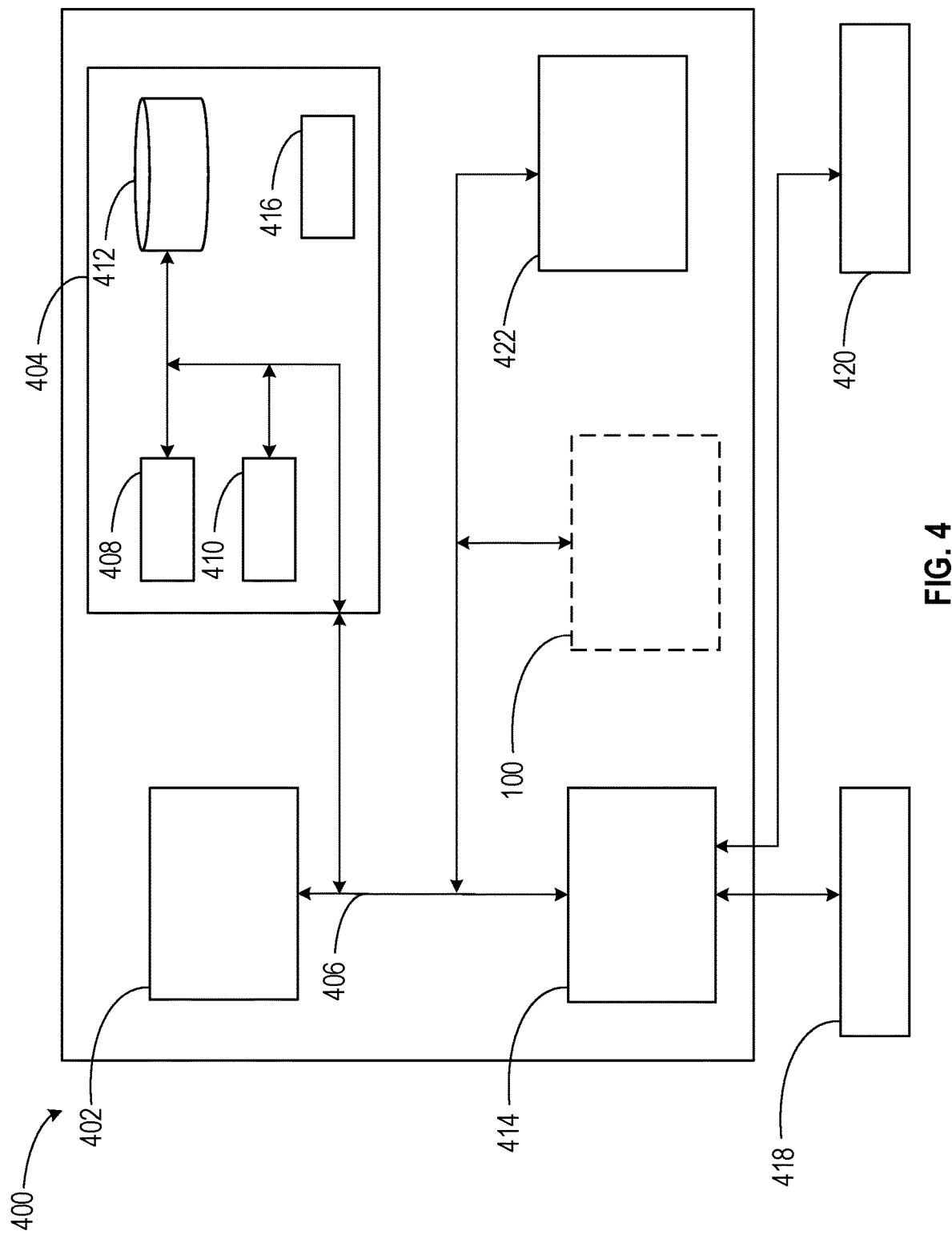
FIG. 4 depicts a block diagram of a computing system for representational learning of product formulas, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for occupant-based elevator actions.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the identification component 110, the status component 120, the dispatch component 130, the control component 140, and the isolation component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
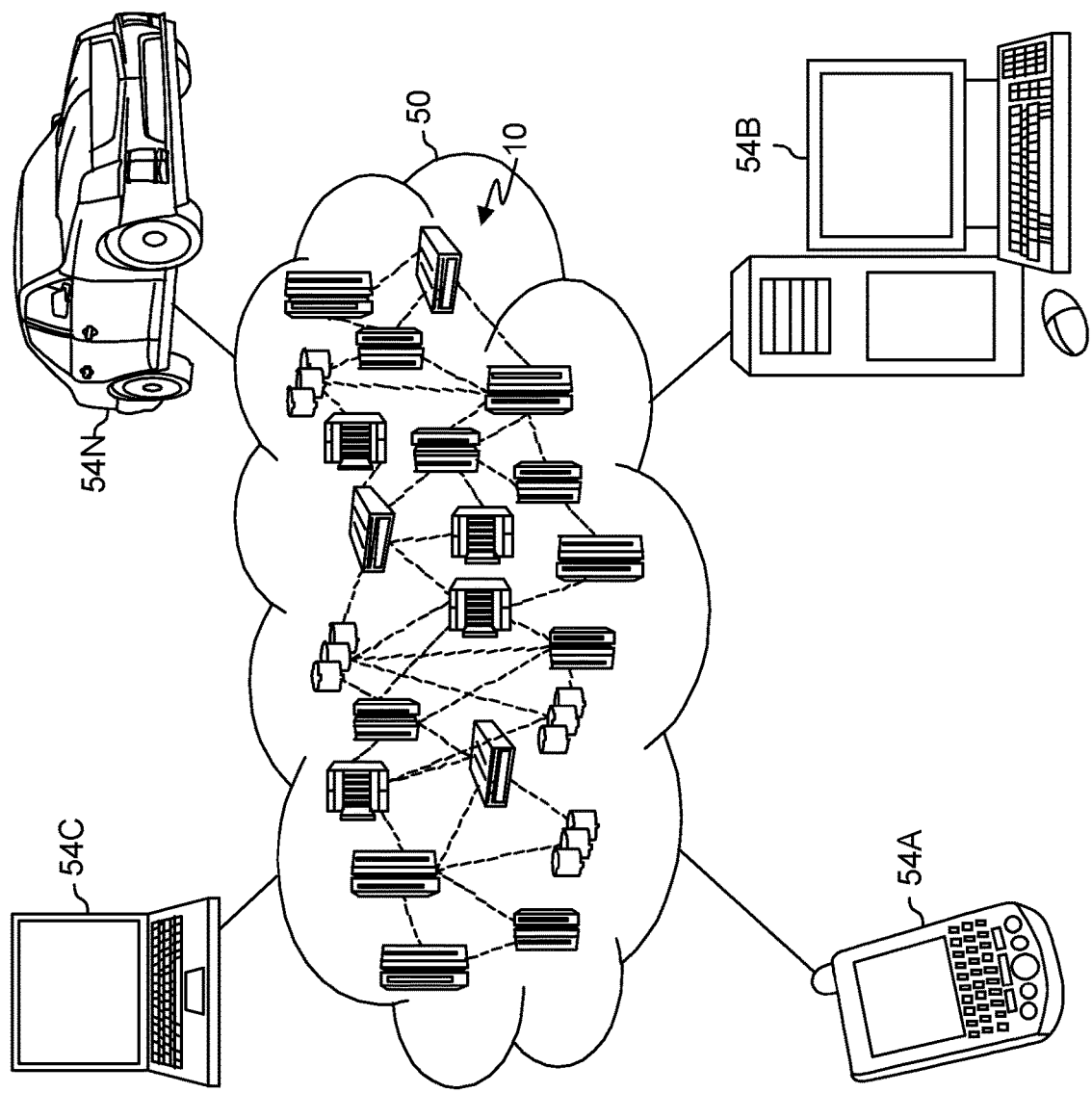
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
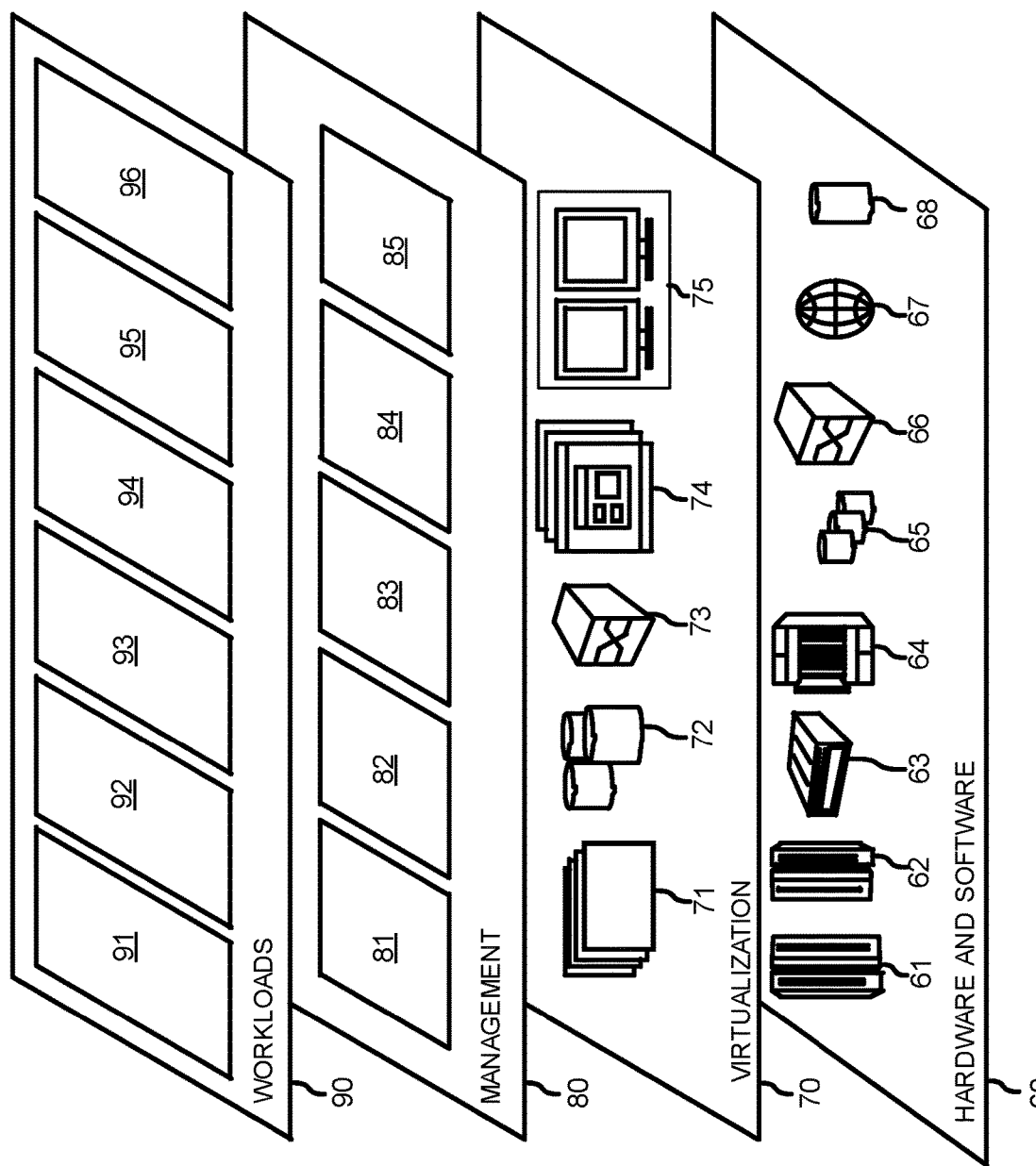
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and elevator control processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a set of subjects approaching a set of elevators to generate a set of identities for the set of subjects;
   generating a set of initial priority statuses for the set of subjects, each initial priority status generated based on an identity for a subject of the set of subjects;
   based on the set of identities and the set of initial priority statuses, determining an elevator dispatch solution for one or more elevators of the set of elevators;
   in response to a subset of subjects entering an elevator, updating at least a portion of the initial priority statuses to generate a set of subsequent priority statuses;
   determining that at least one identity generated for the subset of subjects is associated with a preset response code;
   in response to the determining, adjusting interior settings of the elevator based on the preset response code;
   determining an isolation response for a first subject of the subset of subjects;
   modifying the elevator dispatch solution based on at least a portion of the set of subsequent priority statuses and the isolation response to generate an isolation dispatch solution; and
   causing the elevator to execute the isolation dispatch solution.

2. The method of claim 1, wherein the set of identities is generated based on first identification information obtained by one or more facility sensors.

3. The method of claim 2, further comprising:
   in response to the subset of subjects entering the elevator, modifying a subset of identities based on second identification information obtained by one or more elevator sensors, the subset of identities corresponding to the subset of subjects entering the elevator.

4. The method of claim 1, wherein the isolation response is determined based on an identity of the first subject.

5. The method of claim 1, wherein the isolation response is determined based on an isolation event associated with the first subject.

6. The method of claim 1, wherein executing the isolation dispatch solution isolates the first subject from one or more subjects of the subset of subjects that entered the elevator.

7. The method of claim 1, wherein executing the isolation dispatch solution locks one or more manual interface controls of the elevator.

8. A system, comprising:
   one or more processors; and
   a computer-readable storage medium, coupled to the one or more processors, storing program instructions that, when executed by the one or more processors, cause the one or more processors to perform operations comprising:
   identifying a set of subjects approaching a set of elevators to generate a set of identities for the set of subjects;
   generating a set of initial priority statuses for the set of subjects, each initial priority status generated based on an identity for a subject of the set of subjects;
   based on the set of identities and the set of initial priority statuses, determining an elevator dispatch solution for one or more elevators of the set of elevators;
   in response to a subset of subjects entering an elevator, updating at least a portion of the initial priority statuses to generate a set of subsequent priority statuses;
   determining that at least one identity generated for the subset of subjects is associated with a preset response code;
   in response to the subset of subjects having entered the elevator, adjusting interior settings of the elevator based on the preset response code;
   determining an isolation response for a first subject of the subset of subjects;
   modifying the elevator dispatch solution based on at least a portion of the set of subsequent priority statuses and the isolation response to generate an isolation dispatch solution; and
   causing the at least one elevator to execute the isolation dispatch solution.

9. The system of claim 8, wherein the set of identities is generated based on first identification information obtained by one or more facility sensors.

10. The system of claim 9, wherein the operations further comprise:
    in response to the subset of subjects entering the elevator, modifying a subset of identities based on second identification information obtained by one or more elevator sensors, the subset of identities corresponding to the subset of subjects entering the elevator.

11. The system of claim 8, wherein the isolation response is determined based on an identity of the first subject.

12. The system of claim 8, wherein the isolation response is determined based on an isolation event associated with the first subject.

13. The system of claim 8, wherein executing the isolation dispatch solution isolates the first subject from one or more subjects of the subset of subjects that entered the elevator.

14. The system of claim 8, wherein executing the isolation dispatch solution locks one or more manual interface controls of the elevator.

15. A computer program product comprising a computer readable storage medium having program instructions embodied therewith, the program instructions being executable by one or more processors to cause the one or more processors to perform operations comprising:
    identifying a set of subjects approaching a set of elevators to generate a set of identities for the set of subjects;
    generating a set of initial priority statuses for the set of subjects, each initial priority status generated based on an identity for a subject of the set of subjects;
    based on the set of identities and the set of initial priority statuses, determining an elevator dispatch solution for one or more elevators of the set of elevators;

in response to a subset of subjects entering an elevator, updating at least a portion of the initial priority statuses to generate a set of subsequent priority statuses;

determining that at least one identity generated for the subset of subjects is associated with a preset response code;

in response to the determining, adjusting interior settings of the elevator based on the preset response code;

determining an isolation response for a first subject of the subset of subjects;

modifying the elevator dispatch solution based on at least a portion of the set of subsequent priority statuses and the isolation response to generate an isolation dispatch solution; and causing the at least one elevator to execute the isolation dispatch solution.

16. The computer program product of claim 15, wherein the set of identities is generated based on first identification information obtained by one or more facility sensors and wherein the operations further comprise:

in response to the subset of subjects entering the elevator, modifying a subset of identities based on second identification information obtained by one or more elevator sensors, the subset of identities corresponding to the subset of subjects entering the elevator.

17. The computer program product of claim 15, wherein the isolation response is determined based on an identity of the first subject.

18. The computer program product of claim 15, wherein the isolation response is determined based on an isolation event associated with the first subject.

19. The computer program product of claim 15, wherein executing the isolation dispatch solution locks one or more manual interface controls of the elevator.

20. The method of claim 1, wherein generating the initial priority statuses comprises generating a priority record for a subject from the set of subjects, the priority record comprising an initial priority score and a response code associated with an identity of a subject from the set of subjects.

* * * * *